United States Patent

[11] 3,563,597

| [72] | Inventors | Karl Wilfert<br>Gerlingen-Waldstadt;<br>Bela Barenyi, Stuttgart-Vaihingen,<br>Germany |
|---|---|---|
| [21] | Appl. No. | 734,939 |
| [22] | Filed | June 6, 1968 |
| [45] | Patented | Feb. 16, 1971 |
| [73] | Assignee | Daimler-Benz Aktiengesellschaft<br>Stuttgart-Unterturkheim, Germany |
| [32] | Priority | June 8, 1967 |
| [33] | | Germany |
| [31] | | D53290 |

[54] MOTOR VEHICLE BODY END SECTION
14 Claims, 8 Drawing Figs.

[52] U.S. Cl. .................................................... 296/28,
240/7.1
[51] Int. Cl. ....................................................... B62d 25/00
[50] Field of Search ........................................... 296/28, 1;
240/7.1, 8.1; D14/3(4.6)

[56] References Cited
UNITED STATES PATENTS

| D148,680 | 2/1948 | Douglas.................... | D14/3(4.6) |
| 1,978,293 | 10/1934 | Burney........................ | 240/7.1 |
| 2,937,267 | 5/1960 | Hercules..................... | 240/7.1X |
| 3,068,041 | 12/1962 | Barenyi...................... | 296/28 |

FOREIGN PATENTS

| 1,352,704 | 1/1964 | France...................... | 296/28 |

Primary Examiner—Leo Friaglia
Assistant Examiner—John A. Pekar
Attorney—Craig, Antonelli, Stewart & Hill ABSTRACT: A motor vehicle body end section, particularly a front end section for passenger motor vehicles which is characterized by headlights arranged in a plane extending transversely to the vehicle longitudinal axis directly in front of the front wheels of the vehicle and by lateral body flanks which extend at an inclination to the vehicle longitudinal axis in the direction toward the front end of the vehicle whereby the lateral body flanks are so inclined that they are matched approximately to the boundary of the light cones of the headlights.

PATENTED FEB 16 1971
3,563,597
SHEET 1 OF 2
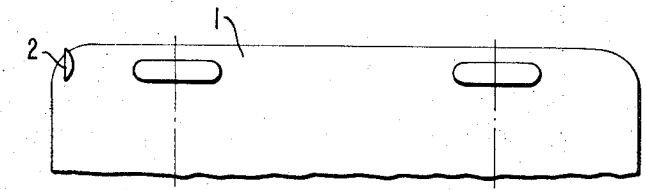
FIG. 1a
PRIOR ART
FIG. 1b
PRIOR ART
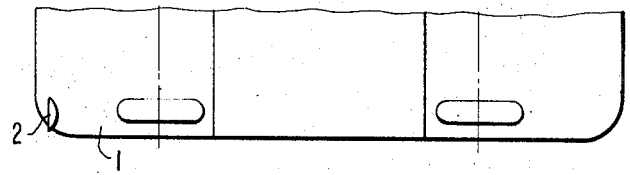
FIG. 2
PRIOR ART
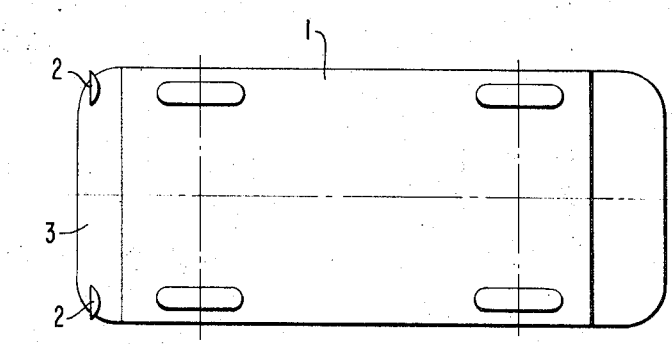
FIG. 3a
FIG. 3b
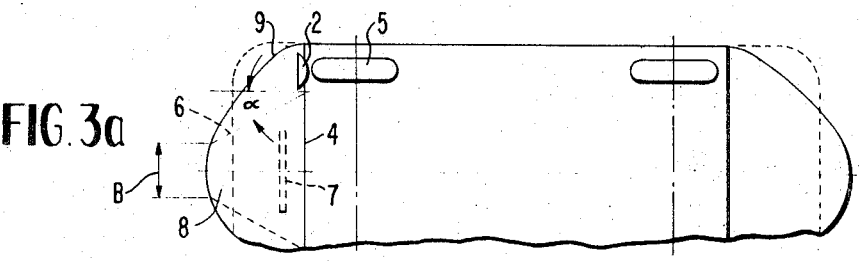
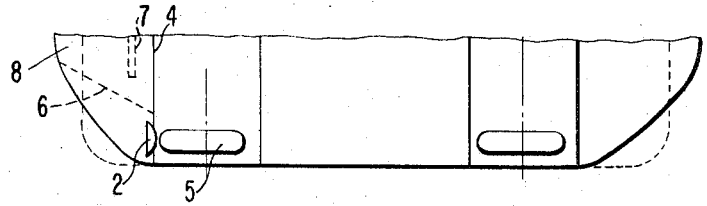
INVENTORS
KARL WILFERT
BÉLA BARÉNYI
BY
Craig & Antonelli
ATTORNEYS

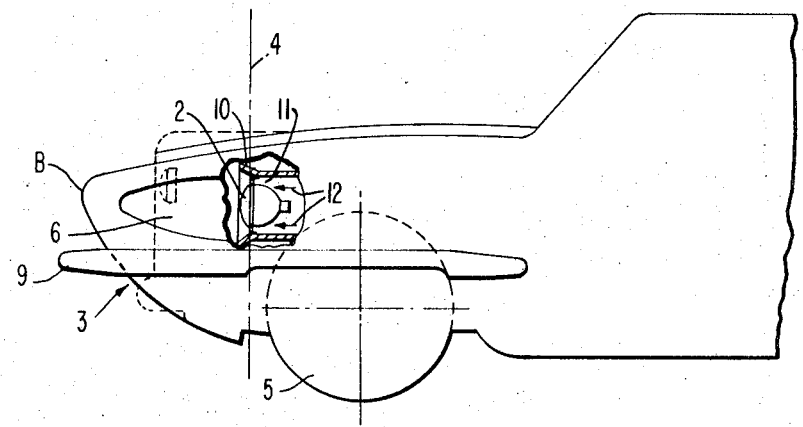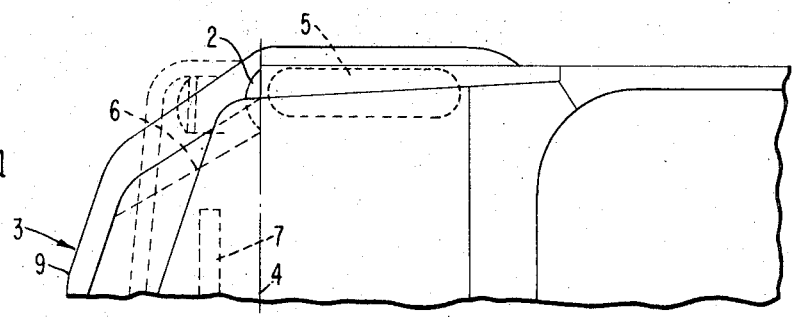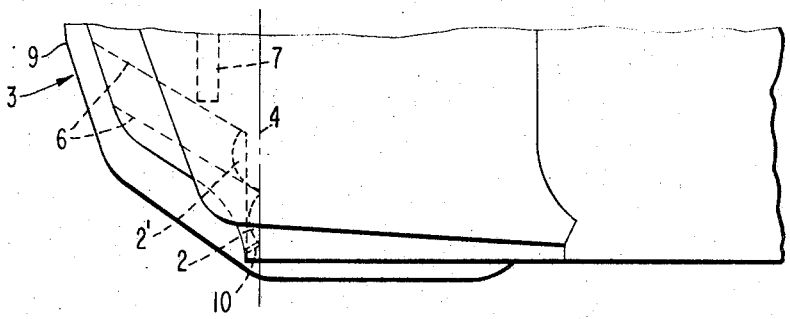

3,563,597

MOTOR VEHICLE BODY END SECTION

BACKGROUND OF THE INVENTION

The present invention relates to a motor vehicle body end part, and more particularly to a vehicle front section for a passenger motor vehicle.

Known motor vehicle bodies with headlights arranged within the vehicle body entail the disadvantage that the headlights displaced forwardly in general relatively far, are exposed to the danger of damage and soiling by such parts as, for example, are thrown up from the road by passing vehicles. Particularly, however, in case of collisions and accidents, which may also be relatively slight, the headlights are also damaged in most cases. Repair expenditures result therefrom. Therebeyond, damaged headlights represent a danger both for the passengers as also for other traffic participants if such damages occur during the night time.

It has already been proposed for the protection of the headlights to provide cover caps which cover the headlights during daylight driving and thus protect the headlights. These protective caps, however, do not offer a sufficient protection against damages during smaller collisions because in this case, the protective cap inclusive headlights is damaged.

SUMMARY OF THE INVENTION

The present invention aims at avoiding these disadvantages of the known bodies and to create a new arrangement which contributes to the increase of the safety of motor vehicles as it safeguards the headlights far-reachingly against soiling and damaging and thereby assures the continued usability in traffic of the vehicle also after smaller collisions. The invention is characterized in motor vehicle bodies of the aforementioned type by headlights arranged in a plane located in an area directly in front of the front wheels and by lateral flanks of the body extending obliquely toward the tip or head of the vehicle and matched approximately to the boundary of the light cones of the headlights. The headlights are displaced back into a protected area by the present invention without impairing their efficacy. In an advantageous further development of the present invention, the inclination of the body flanks toward the vehicle head may be slightly smaller than the inclination of the boundary of the headlight cones so that the lateral flanks are illuminated by the headlights. As a result thereof, the vehicle is also well visible from the side.

A particularly favorable construction results if the body flanks with an inclination of about 30° to the vehicle longitudinal axis are extended forwardly so far that the front part resulting at the vehicle tip only possesses about ¼ to ⅓ of the vehicle width. More particularly, one obtains by such a construction an extension of the vehicle body beyond the headlights in the forward direction which absorbs eventual slight shocks in case of collisions and accidents without adversely affecting or damaging the headlights. Simultaneously, the forwardly extended vehicle head part also acts in a dust— and dirt—deflecting manner for the headlights which, with this type of construction, are not exposed directly to the airstream. Since the vehicle front part with this type of construction is provided with lateral flanks extending forwardly in a pointed manner, the entire overall length of the vehicle is not disadvantageous because, for example, the vehicle can be driven more readily into an existing parking space due to the elimination of the laterally projecting corners. The advantage of the additional front end space achieved by this particular construction, however, resides above all in that a genuine additional deformation space is gained thereby which can absorb deformation work in case of collisions without adversely affecting significant parts of the vehicle as, for example, the engine radiator or the headlights. The thus-constructed vehicle body end section is appropriately constructed as readily detachable body headpiece which can be exchanged after smaller collisions and accidents. The plane in front of the front wheels in which are arranged the headlights may then be constructed as separating plane for securing the headpiece which is detachable toward the front from the headlights on.

A further appropriate development of the subject matter of the present invention results if the body flanks are curved concavely and enclose in part the headlight cone because a better protection of the headlights can be achieved thereby.

The body flanks can thereby also be offset step-shaped and further headlights can be arranged to the rear of the step or steps which increase the light output of the vehicle. For the accommodation of the headlight housings, the body flanks may also be equipped with protective rings conically enlarged in the forward direction into which are inserted the headlights. With such a type of construction one obtains the appropriate possibility to provide the conical protecting rings with apertures at their sides adjoining the headlights which are in communication with the radiator fan and/or with further fans or blowers. This type of construction enables thereby an additional far-reaching protection of the headlights because, for example, air can be blown from behind past the headlights which acts in a dirt-eliminating or dirt-deflecting manner. Also, the danger of icing of the headlights can be counteracted in this manner because the airstream removed from the radiator fan is heated up and avoids any ice formation at the headlights.

Accordingly, it is an object of the present invention to provide a headlight arrangement for motor vehicles which avoids by simple means the aforementioned shortcomings and drawbacks encountered in the prior art.

Another object of the present invention resides in a motor vehicle body end section which greatly reduces the danger of damage and soiling of the headlights of the vehicle.

A further object of the present invention resides in a motor vehicle body end section which is so constructed as to minimize damage to the headlights in case of minor collision accidents, thereby minimizing repair expenditures.

Still a further object of the present invention resides in a motor vehicle body end section which greatly reduces the danger due to damaged headlights.

Still another object of the present invention resides in a motor vehicle body end section which not only greatly contributes to the safety of the headlights but additionally contributes to the good visibility of the vehicle from the sides.

Another object of the present invention resides in a vehicle body end section which not only achieves all of the aforementioned aims and objects but additionally simplifies repair in case of damage while at the same time providing an additional deformation space in case of front end collisions and accidents.

These and further objects, features, and advantages of the present invention will become more obvious from the following description when taken in connection with the accompanying drawing which shows, for purposes of illustration only, several embodiments in accordance with the present invention, and wherein:

FIG. 1a is a schematic plan view of a vehicle body construction of the prior art;

FIG. 1b is a schematic plan view of a vehicle body of a prior art cellular-type vehicle;

FIG. 2 is a schematic plan view of a prior art vehicle body with so-called end caps;

FIG. 3a is a schematic plan view of a vehicle body in accordance with the present invention provided with end caps;

FIG. 3b is a schematic plan view of a vehicle body according to the present invention in a cell-type vehicle;

FIG. 4 is a partial schematic side view of a vehicle body constructed in accordance with the present invention, with parts thereof broken away for sake of clarity; and FIGS. 5a and 5b are schematic plan views on two modified constructions of the vehicle body illustrated in FIG. 4.

Referring now to the drawing wherein like reference numerals are used throughout the various views to designate like parts, it being understood that the other half of a vehicle omitted in some of the views being mirror-imagelike and more particularly to FIGS. 1a, 1b and 2, various types of constructions of known modern vehicle body arrangements are illustrated in these FIGS. In connection therewith, one headlight 2 each is arranged in a pontoon-shaped body 1 in proximity to each forward corner of the vehicle of FIG. 1a in order that its light cone is not impaired by the vehicle body parts. The same is also true for the body according to FIG. 1b of a so-called cellular-type vehicle. In FIG. 2, a prior art body arrangement with a headpiece 3 is illustrated which is mounted interchangeably. Also with this type of construction of the body, the headlights 2 are arranged in the corners of the body and are therefore exposed to a strong soiling during the drive as also to the danger of damage even with slight collisions and accidents.

In contradistinction thereto, the arrangement of the present invention is illustrated in FIGS. 3a and 3b in which the headlights 2 are displaced into the plane 4 directly in front of the front wheels and in which the body flanks in front of the headlights 2 are matched approximately to the cones of the light beams of the headlights 2 and extend acutely in the forward direction. The angle $\alpha$, which the body flanks assume to the vehicle longitudinal axis, amounts to about 30°. The length of the flanks 6 is so selected that the resulting width B of the vehicle front part, amounts to about ¼ to ⅓ of the entire vehicle width.

An extension of the vehicle body in the forward direction results from this construction which serves as protection in particular for the headlights 2 displaced toward the rear. Since the additional space 8 gained in front of the headlights 2 and in front of the vehicle radiator 7, indicated in dash lines, contains no engine parts, it serves in case of collisions as genuine deformation space whose effectiveness is not impaired by parts rigidly arranged on the inside thereof. Smaller impacts against the vehicle front section are therefore absorbed by the body. Engine parts or the headlights are not impaired.

In the illustrated embodiment, the front end section with the flanks 6 is constructed detachable forwardly from the plane 4 without the headlights 2. An easy repair and reconditioning of the vehicle by the replacement of the deformed front end section is therefore possible.

It can be readily seen from FIGS. 3a and 3b that the overall length of the vehicle is larger in comparison to the length of a motor vehicle of conventional construction. This increase in the length entails, as mentioned above, advantages in case of head-on collisions and accidents. By reason of the fact that the body flanks 6 and also the contour 9, for example, the bumper of the vehicle, extends acutely toward the front, this greater length does not affect unfavorably the maneuverability of the vehicle which can be readily driven into existing parking areas because the projecting corners, which normally impair the lateral maneuverability of the vehicle are eliminated.

An arrangement is illustrated in FIG. 3b in which, in addition to the front end section, three still further cells of the vehicle are present. The thus resulting five-cell vehicle permits an extraordinarily easy assembly because each of the illustrated cells can be manufactured separately by itself and can be assembled with the other cells into the entire vehicle.

In FIGS. 4 and 5, the headlights 2 are also displaced into the plane 4 which extends directly in front of the front wheels 5. The flanks 6 of the forwardly tapering vehicle front end section generally designated by reference numeral 3 are matched approximately to the boundary of the light cone (not shown) of the headlight 2. The inclination of the flanks 6 is thereby chosen slightly smaller than the inclination of the cones of the headlight beams so that a part of the headlight illumination falls on these flanks 6 and illuminates the same.

For purposes of comparison, the contour of a vehicle of heretofore conventional construction is indicated in FIGS. 4 and 5 in dash line. It can be readily seen that the headlights 2 of the present invention are displaced back compared to the known constructions whereas the front end is extended forwardly. As can be seen from FIG. 5b, the flanks 6 can also be offset step-shaped so that two headlights 2 and 2' are arranged at the rear end of the flank walls 6. The flank walls 6 are curved concavely in the illustrated embodiment and partially surround the headlights 2 and 2' and their light cones. The front end section 3 is in this embodiment constructed readily detachable within the area of the separating plane 4 so that the entire part of the body disposed in front of the headlights 2 is removable and interchangeable.

As can be further seen from FIG. 4, provision is made additionally in a particular type of construction that the headlights 2 are surrounded by a protective ring 10 enlarged forwardly in a conical manner which possesses apertures 11 on its inner side toward the headlight 2 that are in communication with the radiator fan (not shown) and/or additional blowers. It is thereby possible, as indicated by the arrows 12, to blow air from behind past the headlights 2 in the forward direction. If the air to the rear of the radiator fan is used for that purpose, then one can prevent, for example, that snow or ice deposits during the winter at the headlights 2 and impairs the lighting capacity thereof.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A motor vehicle body end section, especially front end section for passenger motor vehicles, wherein headlight means are operatively received within the body end section forward of the front axle, the headlight means being arranged in a plane located within an area directly in front of the front wheels of the motor vehicle, wherein the front body end section deforms in case of collisions so as to constitute means for deformation and being provided with lateral body flank means extending obliquely toward the front end of the motor vehicle and matched approximately to the boundary of the light cones of the headlight means, wherein the lateral body flank means are curved concavely and partly surround the headlight means, and protective ring means are provided on the vehicle body adjacent to the lateral body flank means for the accommodation of the housing of the headlight means, said protective ring means being enlarged conically in the forward direction, and the headlight means being inserted into the protective ring means.

2. Motor vehicle body according to claim 1, wherein the inclination of the body flank means toward the vehicle head is slightly less than the inclination of the boundary of the headlight cone.

3. Motor vehicle body according to claim 2, wherein the body flank means with an inclination of approximately 30° to the vehicle longitudinal axis are extended forwardly to such an extent that the front part resulting at the vehicle head has only about one-fourth to one-third vehicle width.

4. A motor vehicle body according to claim 3, wherein the vehicle body end section is constructed as readily detachable body headpiece.

5. A motor vehicle body according to claim 4, wherein the plane in front of the front wheels, in which the headlight means are arranged, is constructed as separating plane for securing the headpiece.

6. A motor vehicle body according to claim 1, wherein the vehicle body end section is constructed as readily detachable body headpiece.

7. A motor vehicle body according to claim 6, wherein the plane in front of the front wheels, in which the headlight means are arranged, is constructed as separating plane for securing the headpiece.

8. A motor vehicle body end section, especially front end section for passenger motor vehicles, comprising headlight means arranged in a plane located within an area directly in front of the front wheels, and lateral body flank means in the end section extending obliquely toward the front of the vehicle and matched approximately to the boundary of the light cones of the headlight means, the inclination of the body flank means toward the vehicle head being slightly less than the inclination of the boundary of the headlight cone and with an inclination of approximately 30° to the vehicle longitudinal axis, the body flank means being extended forwardly to such an extent that the front part resulting at the vehicle head has only about one-fourth to one-third the vehicle width, the vehicle body end section being constructed as a readily detachable body headpiece, wherein the plane in front of the front wheels, in which the headlight means are arranged, is constructed as a separating plane for securing the headpiece, the body flank means being curved concavely and partly surrounding the headlight cone, wherein the body flank means are offset step-shaped, and further headlight means are arranged to the rear of each step.

9. A motor vehicle body according to claim 8, wherein the body flank means are equipped with protective ring means for the accommodation of the housing of the headlight means, said protective ring means being enlarged conically in the forward direction, and the headlight means being inserted into the protective ring means.

10. A motor vehicle body according to claim 9, wherein the protective ring means are provided at the side adjoining the headlight means with aperture means in communication with fan means.

11. A motor vehicle body according to claim 10, wherein the fan means is a radiator fan.

12. A motor vehicle body end section, especially front end section for passenger motor vehicles, comprising headlight means arranged in a plane located within an area directly in front of the front wheels, and lateral body flank means in the end section extending obliquely toward the front of the vehicle and matched approximately to the boundary of the light cones of the headlight means, wherein the body flank means are offset step-shaped, and further headlight means are arranged to the rear of each step.

13. A motor vehicle body end section, especially front end section for passenger motor vehicles, comprising headlight means arranged in a plane located within an area directly in front of the front wheels, and lateral body flank means in the end section extending obliquely toward the front of the vehicle and matched approximately to the boundary of the light cones of the headlight means, wherein the body flank means are equipped with protective ring means for the accommodation of the housing of the headlight means, said protective ring means being enlarged conically in the forward direction, and the headlight means being inserted into and operatively the protective ring means, wherein the protective ring means are provided at the side adjoining the headlight means with aperture means in communication with fan means.

14. A motor vehicle body according 13, wherein the fan means is a radiator fan.